N. W. AKIMOFF.
PRESSURE RECORDING INSTRUMENT.
APPLICATION FILED JUNE 6, 1913.
1,098,931.
Patented June 2, 1914.
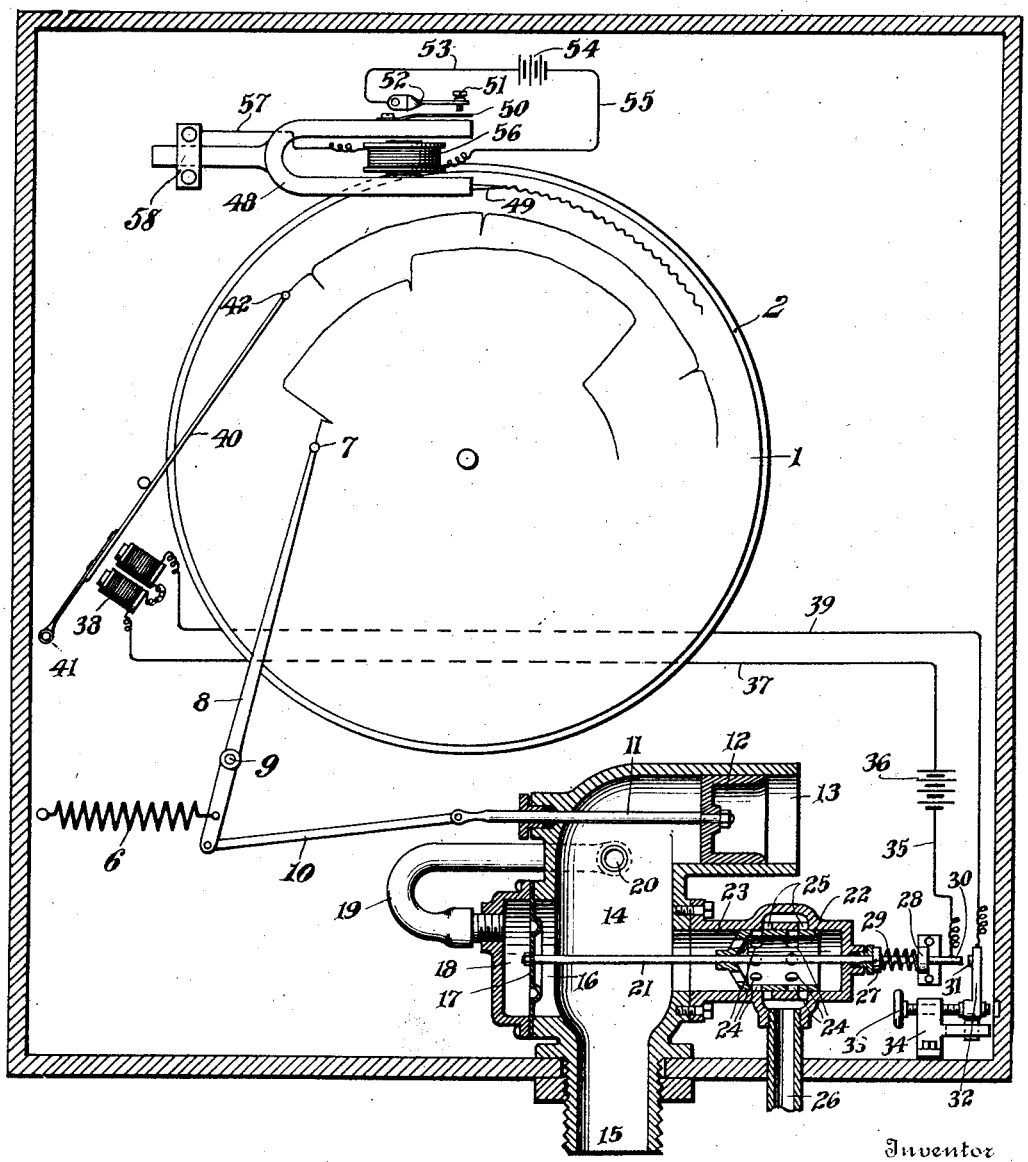
Witnesses
Daniel Webster, Jr.
William Conway
Inventor
Nicholas W. Akimoff.
By Jas. C. Nobmsmith
Attorney

UNITED STATES PATENT OFFICE.

NICHOLAS W. AKIMOFF, OF PHILADELPHIA, PENNSYLVANIA.

PRESSURE-RECORDING INSTRUMENT.

1,098,931.  Specification of Letters Patent.  Patented June 2, 1914.

Application filed June 6, 1913. Serial No. 772,080.

*To all whom it may concern:*

Be it known that I, NICHOLAS W. AKIMOFF, a subject of the Czar of Russia, residing at Philadelphia, in the county of Philadelphia and State of Pennsylvania, have invented certain new and useful Improvements in Pressure-Recording Instruments, of which the following is a specification.

My invention relates to pressure recording instruments and it has particular relation to apparatus for automatically making a record of instantaneous variations in pressure in water mains and other hydraulic apparatus.

The object of my invention is to provide a simple and efficient apparatus for recording and registering rapid variations in pressure which will operate without undue lag, which will be more sensitive to sudden changes of pressure than the ordinary types of pressure recording instruments, which will make a separate record of the time of occurrence of variations in pressure, which will accentuate on the main record the occurrence of variations of the pressure, and in which the time element will be accurately indicated during the marking of the record notwithstanding variations in the speed of movement of the chart.

The nature and characteristic features of my invention will be more readily understood from the following description taken in connection with the accompanying drawing, forming part hereof, which shows an elevational view to a certain extent diagrammatic, of an apparatus embodying the main features of my present invention.

Referring to the drawing in the particular embodiment of my invention therein shown, 1 is a flat circular chart of the well known type which is mounted upon a suitable disk 2 and rotated about its center by clockwork, not shown, but in the manner well known and understood by those making and using instruments of this general character. Any of the other well known types of movable chart may be substituted for the flat circular chart shown without departing from the spirit of my invention.

7 is a pen or other suitable marking device adapted to trace a record upon the chart 1, which pen is mounted on the end of a lever arm 8 which lever arm is pivoted as at 9 to a stationary part of the structure. A connecting rod 10 is pivoted to the end of the lever arm 8 opposite to the marking pen 7 and extends to a pivotal connection with one end of a piston rod 11 which carries a piston 12 at its other end. A spring 6 connected at one end to the lever 8 and at the other end to a stationary portion of the structure normally tends to move the piston inwardly within its cylinder 13. The piston 12 is mounted to be freely movable in the cylinder 13 which extends from the upper end of a chamber 14 which chamber is adapted to be hydraulically connected by means of a threaded nipple 15 to the water main or other hydraulic apparatus, the phenomena in connection with which it is desired to investigate.

Extending from one side of the main chamber 14 is an auxiliary chamber 16 at the end of which is mounted a flexible diaphragm 17, and a casing mounted on the outside of the diaphragm 17 forms a chamber 18 which is in communication preferably by means of a rubber hose 19 with an inlet 20 provided in the upper portion of the main chamber 14. By this arrangement the diaphragm 17 is normally subjected to uniform pressure on both sides but when a sudden change in pressure in the chamber 14 occurs this change will be felt initially on the inner side of said diaphragm, and the shock thereby caused will be delayed in transmission through the flexible connection (rubber hose 19) and will thus be felt at a slightly later period on the outer side of the diaphragm. Other means of slightly delaying the transmission of the shock to the other side of the diaphragm may be employed if desired. The flexible diaphragm 17 is provided with a rod 21 secured to the center thereof and extending into an oppositely disposed cylinder 23 which is also in communication with the main chamber 14. Mounted on the rod 21 is a piston sleeve 22 mounted to be freely slidable in the cylinder 23, and the sleeve 22 is provided with a plurality of apertures 24 normally closed by the walls of the cylinder 23, but adapted when the sleeve 22 is moved, as hereinafter more fully set forth, to register with a series of apertures 25 in the walls of the cylinder 23 so as to provide an outlet through pipe 26 for the water within the cylinder 23 and consequently the main chamber 14. The rod 21 also extends through a stuffing box at the end of the cylinder 23 and is supported at its outer end in a bracket 28 secured to a stationary part of the structure. A spring 29 surrounds the rod 21 and bears at one end against the bracket 28 and at its other end against a collar 27 which collar may also act as a stop to limit the movement of the rod 21 and the parts secured thereto, namely, the diaphragm 17 and the sleeve 22, so as to normally hold these parts in their proper position for the sensitive actuation as above indicated and as will hereinafter be more fully described. The outer end of the rod 21 forms a contact 30 adapted to electrically connect with another contact 31 which is carried on the end of an arm 32 which is mounted in a bracket 34 and is adjustable therein by means of a screw 33.

The end 30 of the rod 21 is electrically connected by means of a wire 35 to a battery 36, the circuit thence extending by means of wire 37 to an electro-magnet 38, thence extending by a wire 39 to the arm 32 which carries the contact 31. Arranged in proximity to the electro-magnet 38 is a pen arm 40 which is pivoted as at 41 and is adapted to be actuated by the magnet 38 when the circuit is established by the touching of the contacts 30 and 31. The arm 40 carries a pen or other marking device 42 at its free end and is adapted, when the arm is actuated as aforesaid, to mark a distinct indication on the chart 1 as clearly shown in the drawings.

It should be understood that the apparatus of my present invention is designed for sensitive and accurate work in connection with the investigation of certain phenomena in water mains and other hydraulic apparatus, and for this work it is essential that some check be had on the speed of rotation of the chart as otherwise considerable inaccuracy in the result might occur on account of variations in the speed of the clockwork or other means for actuating the chart. For this purpose a tuning fork 48 may be employed, having a pen or other suitable marking device 49 mounted upon one tine of the fork, which pen is adapted to trace a wave line upon the chart simultaneously with the marking the pressure record. The fork 48 may be kept in vibration by means of an electro-magnet mounted between the tines of the fork and a contact member 50 may be carried on the end of one of said tines which is adapted to make and break with a screw 51 suitably supported by a bracket 52 from any preferred part of the stationary frame work or housing of the apparatus. The bracket 52 which supports the screw 51 is electrically connected by means of a wire 53 to a battery 54, or other source of electrical energy, the circuit thence passing by wire 55 to the magnet 56, thence by wire 57 to the bracket 58 supporting the fork 48, and finally completing the circuit through the fork to the contact member 50.

The operation of the apparatus will now be readily understood. As before stated the chamber 14 is hydraulically connected with the water main or other hydraulic apparatus under investigation, and the piston 12 and its rod 11, connecting rod 10, pivoted arm 8 and marking device 7 will serve to indicate the variations in pressure occurring in said water main, etc. If, however, this mechanism were used alone, sudden but slight variations in pressure which it is the present purpose to more fully investigate, would not be sufficiently indicated. When a sudden drop of pressure occurs within the chamber 14, which drop however, may be exceedingly minute in its intensity, the shock thereby occurring will be delayed in transmission through the flexible connection 19 to the outer side of the flexible diaphragm 18 and on account of the difference in pressure the rod 21 will thereby be caused to move slightly to the right, thereby establishing a communication between the outlet apertures 24 in the sleeve 22 with the outlet apertures 25 of cylinder 23. A considerable quantity of water within the chamber 14 will thus be permitted to quickly escape, whereupon the piston 12 will be further and violently actuated to cause a distinct demarcation to be traced upon the record by the marking pen 7. At the same time that the rod 21 is thus actuated the contact members 30 and 31 will be brought together and the circuit being thereby established will cause the electro-magnet 38 to actuate the pen arm 40 and its marking device 42 so as to positively indicate the time at which the variations in pressure occur. The tuning fork and its marking device as before stated serves to indicate any inaccuracy in the speed of rotation of the chart so that the time at which the indications occur will be accurately checked.

Having thus described the nature and characteristic features of my invention what I claim as new and desire to secure by Letters Patent is:

1. A pressure recording instrument comprising a movable chart, a pressure chamber, means for marking a record on said chart controlled by the pressure of fluid contained in said chamber, and separate marking means for independently indicating the time of occurrence of variations of pressure in said chamber.

2. A pressure recording instrument comprising a movable chart, a pressure chamber, means for marking a record on said chart controlled by the pressure of fluid contained in said chamber, means for accentuating the record of variations of pressure in said chamber, and separate marking means for independently indicating the time of occurrence of variations of pressure in said chamber.

3. A pressure recording instrument comprising a movable chart, a pressure chamber, means for marking a record on said chart controlled by the pressure of fluid contained in said chamber, means for accentuating the record of variations of pressure in said chamber, separate marking means for independently indicating variations of pressure in said chamber, and independent means for marking a record of the rate of movement of said chart.

4. A pressure recording instrument comprising a movable chart, a pressure chamber, means for marking a record on said chart controlled by the pressure of fluid contained in said chamber, and means for automatically permitting the escape of fluid from said chamber when sudden variations in pressure occur to thereby accentuate the record of said variations of pressure.

5. A pressure recording instrument comprising a movable chart, a pressure chamber, means for marking a record on said chart controlled by the pressure of fluid contained in said chamber, and means for automatically permitting the escape of fluid from said chamber when sudden variations in pressure occur to thereby accentuate the record of said variations of pressure, said means comprising a diaphragm having one side in direct communication with the pressure chamber and having its other side in communication with said pressure chamber through a conduit arranged to delay transmission of the change in pressure, and a valve controlled by said diaphragm.

6. A pressure recording instrument comprising a movable chart, a pressure chamber, means for marking a record on said chart controlled by the pressure of fluid contained in said chamber, and means for automatically permitting the escape of fluid from said chamber when sudden variations in pressure occur to thereby accentuate the record of said variations of pressure, said means comprising a diaphragm having one side in direct communication with the pressure chamber and having its other side in communication with said pressure chamber through a flexible conduit, and a valve controlled by said diaphragm.

7. A pressure recording instrument comprising a movable chart, a pressure chamber, a cylinder in communication with said chamber, a piston movable in said cylinder in accordance with variations in pressure of the fluid contained in said chamber, marking means operatively connected with said piston adapted to trace a record on said chart, means for accentuating variations in pressure in said chamber, and separate marking means for independently indicating the time of occurrence of variations of pressure in said chamber.

8. A pressure recording instrument comprising a movable chart, a pressure chamber, means for marking a record on said chart controlled by the pressure of fluid contained in said chamber, means for accentuating the record of variations of pressure in said chamber, and separate marking means for independently indicating the time of occurrence of variations of pressure in said chamber, said means comprising a marking pen, an electro-magnet for controlling the movement of said pen, an electric circuit in which said magnet is included, said circuit being normally open, and means for closing said circuit upon the occurrence of variations of pressure in the chamber.

9. A pressure recording instrument comprising a movable chart, a pressure chamber, means for marking a record on said chart controlled by the pressure of fluid contained in said chamber, means for accentuating the record of variations of pressure in said chamber, and separate marking means for independently indicating the time of occurrence of variations of pressure in said chamber, said means comprising a marking pen, an electro-magnet for controlling the movement of said pen, an electric circuit in which said magnet is included, and means for controlling said circuit by variations in pressure in the chamber.

10. A pressure recording instrument comprising a movable chart, a pressure chamber, means for marking a record on said chart controlled by the pressure of fluid contained in said chamber, a diaphragm having one side in direct communication with said chamber and having its other side in communication with said chamber through a flexible conduit, a rod connected with said diaphragm, a valve controlled by said rod adapted to momentarily permit the escape of fluid from said chamber, an electric circuit controlled by said rod, an electro-magnet included in said circuit, and a separate marking device controlled by said magnet.

In testimony whereof, I have hereunto signed my name in the presence of two witnesses.

NICHOLAS W. AKIMOFF.

Witnesses:
WILLIAM S. ATCHISON,
LILLIAN H. NEVEIL.